No. 873,620. PATENTED DEC. 10, 1907.
W. C. SCHWARZ.
MOTOR VEHICLE.
APPLICATION FILED MAY 29, 1906.
3 SHEETS—SHEET 3.
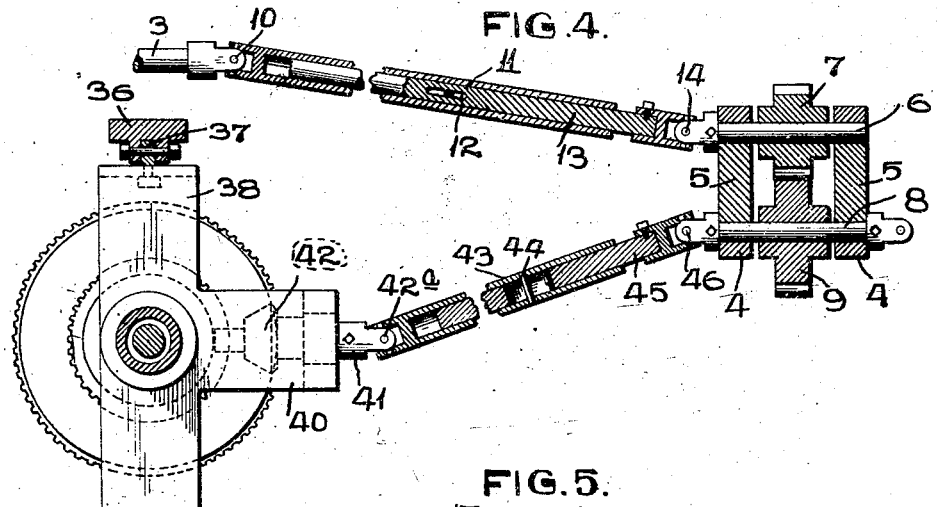
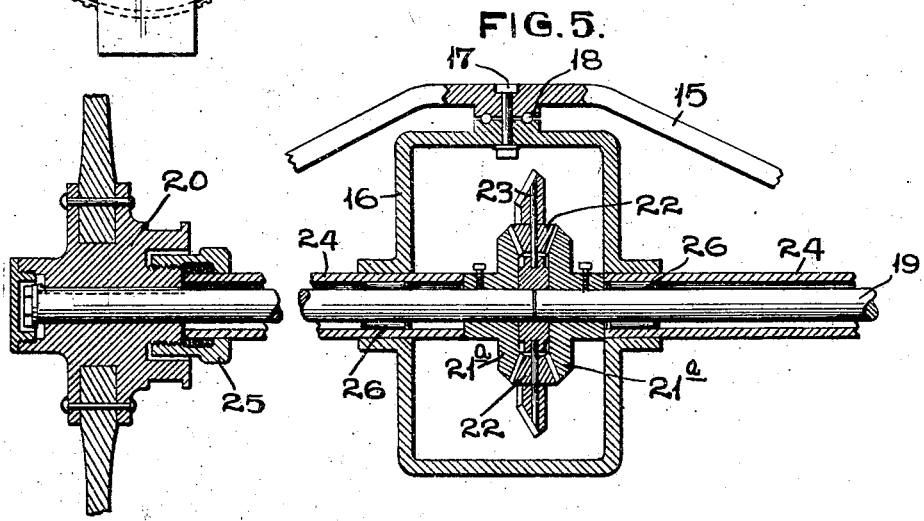
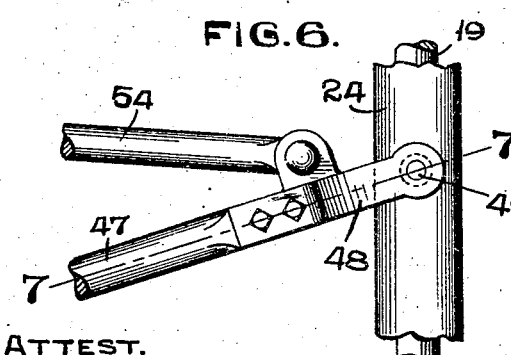
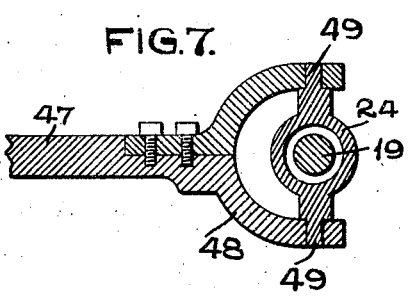
ATTEST.
H. J. Fletcher.
M. P. Smith.
INVENTOR.
WM. C. SCHWARZ
BY Higdon & Longan
ATT'Y'S.

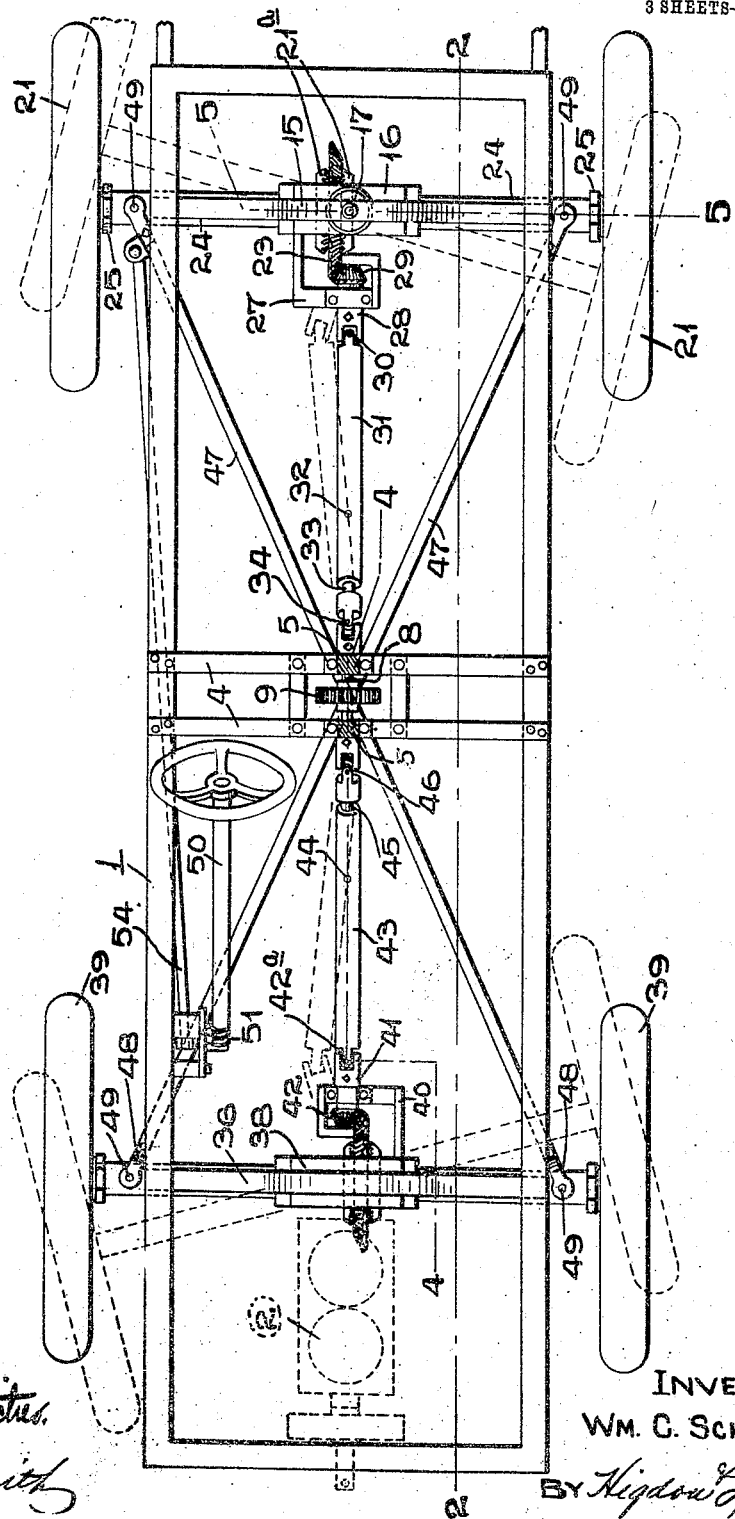

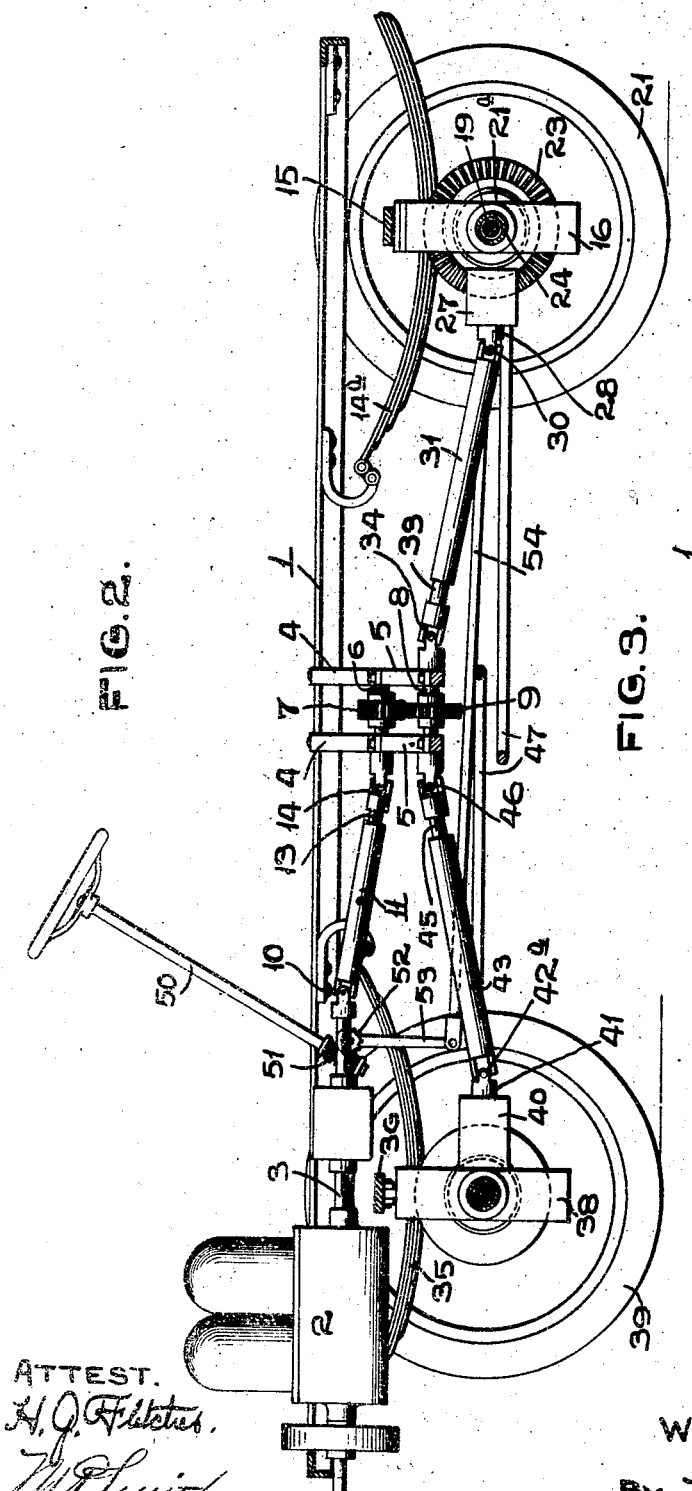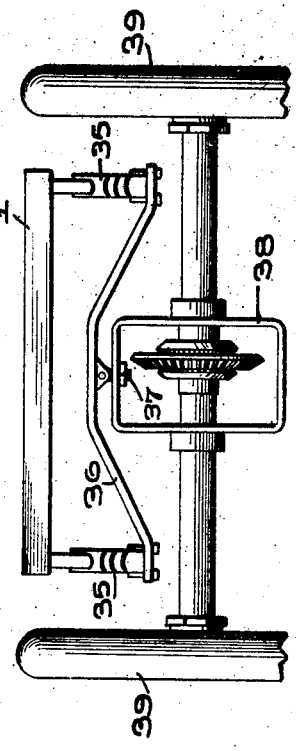

UNITED STATES PATENT OFFICE.

WILLIAM C. SCHWARZ, OF EDWARDSVILLE, ILLINOIS.

MOTOR-VEHICLE.

No. 873,620.　　　　　Specification of Letters Patent.　　　Patented Dec. 10, 1907.

Application filed May 29, 1906. Serial No. 319,358.

*To all whom it may concern:*

Be it known that I, WILLIAM C. SCHWARZ, a citizen of the United States, and resident of Edwardsville, Madison county, Illinois, have invented certain new and useful Improvements in Motor-Vehicles, of which the following is a specification containing a full, clear, and exact description, reference being had to the accompanying drawings, forming a part hereof.

My invention relates generally to motor vehicles, and more particularly to the driving and steering mechanism thereof.

The principal object of my invention is to provide mechanism in a motor vehicle for driving both axles of the vehicle, thereby securing greater traction than in vehicles where but one axle is driven.

A further object of my invention is to construct a motor vehicle wherein the axles are pivoted so that they can be swung laterally upon their centers, and coupling said axles together so that they will be simultaneously shifted in opposite directions by one steering post, thus providing for and permitting the vehicle to be turned in much less space than is required where motor vehicles are steered by the front wheels alone.

A further object of my invention is to do away with the driving chains ordinarily made use of in motor vehicles.

To the above purposes, my invention consists of certain novel features of construction and arrangement of parts, which will be hereinafter more fully set forth, pointed out in the claims, and illustrated in the accompanying drawings, in which:—

Figure 1 is a plan view of the frame of my improved motor vehicle, and showing the driving and steering mechanism as contemplated by my invention; Fig. 2 is a longitudinal section taken on the line 2—2 of Fig. 1; Fig. 3 is an elevation of the rear axle, and showing the connection between the vehicle frame and the differential gear casing on said rear axle; Fig. 4 is an enlarged vertical section taken on the line 4—4 of Fig. 1; Fig. 5 is an enlarged transverse section taken on the line 5—5 of Fig. 1; Fig. 6 is a detail view illustrating a joint in the steering apparatus; Fig. 7 is a detail section taken on the line 7—7 of Fig. 6.

Referring by numerals to the accompanying drawings:—1 designates the frame of the vehicle, which is rectangular in plan view, and constructed of any suitable material. Located at the front of the frame, and supported in any suitable manner is an engine, or motor, 2; and extending rearwardly therefrom is the engine shaft 3. Extending transversely between the side pieces of the frame at the center of the vehicle is a pair of bars 4, which support a pair of brackets 5, and journaled therein is a shaft 6, carrying a small gear wheel 7. Journaled on suitable bearings on the cross bars 4 is a shaft 8, on which is fixed a gear wheel 9, which meshes with the gear wheel 7. Connected by means of a knuckle joint 10 to the end of the engine shaft 3, which projects outwardly from the engine, is a sleeve 11; and arranged to slide therein and to rotate therewith by a pin and slot connection 12 is a shaft 13, the forward end of which is connected by a universal joint 14 to the rear end of the shaft 6.

By the mechanism just described, the rotary motion of the engine shaft 3 is transmitted to the shaft 8.

Arranged beneath the rear portion of the frame 1, and at the sides thereof, are springs 14, the ends of which are connected by suitable hangers to said frame; and arranged beneath the central portions of these springs is a transversely arranged arch-bar 15. This arch-bar is supported by and connected to the differential gear casing 16 on the rear axle by means of a vertically arranged bolt 17, and arranged between the gear casing and arch-bar are suitable ball bearings 18. The rear axle 19 is constructed in two parts, and fixed on the outer end of each part is the hub 20 of a suitable traction wheel 21. The inner ends of the parts of the rear axle 19 terminate adjacent one another within the casing 16, and arranged on said meeting ends is the usual form of differential gearing, comprising a pair of oppositely arranged beveled pinions 21, one of which is mounted on each end of the parts of the axle 19, and which mesh with oppositely disposed beveled pinions 22, carried by the beveled gear wheel 23. Fixed to opposite sides of the casing, and inclosing the parts of the rear axle 19, are sleeves 24, on the outer ends of which are arranged packing nuts 25, which are screw seated on the hubs 20 of the traction wheels 21, thus forming suitable stuffing boxes between the sleeves 24 and hubs 20, to prevent dust and water from entering the outer ends of the sleeves 24, and thus affecting the operation of the rear axle.

Suitable roller bearings 26 are arranged on the interior of the sleeves 24, and support the parts of the axle adjacent the casing 16.

Extending forwardly from one side of the casing 16 is a bracket 27, in which is journaled a short shaft 28, carrying on its rear end a pinion 29 which meshes with the large beveled gear wheel 23 of the differential gear. Connected to the forward end of this shaft 28 by means of the universal joint 30 is a sleeve 31, and carried by said sleeve and arranged to slide therein and rotate therewith by a pin and slot connection 32 is a shaft 33, the forward end of which is connected by a universal joint 34 to the rear end of the shaft 8.

Arranged beneath the front portion of the frame 1 are springs 35, which are in every way similar to the springs 14, and arranged beneath the centers of said springs 35 are the ends of a transversely arranged arch-bar 36. Pivotally connected to the under side of the center of this arch-bar 36 is a downwardly projecting pin 37, which is arranged to rotate in the top of a housing 38, which forms a casing for the differential gearing on the front axle. The front wheels 39 are arranged on the ends of this front axle; and this differential gearing, front axle, and sleeves therefor are in every way similar to the corresponding parts of the rear axle, and as previously described. Extending rearwardly from the casing 38 is a bracket 40, in which is journaled a short shaft 41, the forward end of which carries a beveled pinion 42, which meshes with the large pinion of the differential gearing on the front axle, and arranged within the casing 38.

Connected to the rear end of the shaft 41 by a universal joint 42 is a sleeve 43, and arranged to rotate therewith and to slide therein by means of a slot and pin connection 44 is a shaft 45, the rear end of which is connected by a universal joint 46 to the forward end of the shaft 8. By means of the connections just described, the rotary motion of the engine which is imparted to the shaft 8 is transmitted simultaneously to both the front and rear axles.

A pair of rods 47 are crossed beneath the frame 1, and the driving mechanism just described, and the ends of said cross rods are bifurcated, as indicated by 48; and pivotally engage on vertically arranged trunnions 49 that are formed integral with the outer ends of the sleeves 24, which inclose the rear axle, and the corresponding sleeves which inclose the front axle. Thus the right hand end of the front axle is connected with the left hand end of the rear axle, and the left hand end of the front axle is connected with the right hand end of the rear axle.

The steering post 50 is arranged for operation on the right hand side of the frame 1, and the lower end of said post is provided with a thread 51, which meshes with a worm pinion 52, arranged in suitable bearings on the right hand side of the frame 1. Depending from the shaft on which this worm pinion is mounted is a lever 53, and pivotally connected to the lower end thereof is a rearwardly extending rod 54, the rear end of which is pivotally connected with the rear end of the cross rod 47, which connects with the right hand end of the rear axle.

The mechanism just described comprises the steering gear, and by the arrangement of the cross rods 47, the axles of the vehicle are shifted upon their pivotal points in opposite directions.

The operation of my improved motor vehicle is as follows: The engine or motor 2 being started, drives the sleeve 11 and shaft 13, and in turn the shaft 6 carrying the pinion 7 is driven. This rotary motion is imparted to the shaft 8 carrying the pinion 9, and in turn the shafts 33 and 45, and sleeves 31 and 43 are rotated, which in turn rotate the short shafts 28 and 41, carrying the pinions 29 and 42, which mesh with and drive the large beveled gear wheels 23 of the differential gears mounted upon the front and rear axles. Thus, both axles are simultaneously rotated to cause a corresponding rotation of the traction wheels 21 fixed on the ends of said axles. When it is desired to turn the motor vehicle, the steering post 50 is rotated, and the thread 51, meshing with the worm wheel 52, correspondingly shifts the lever 53, and by means of the connecting rod 54 this motion is transmitted to the cross rod 47, to which the rod 54 is connected. This action necessarily shifts the rear axle, and parts carried thereby, upon its pivot point, which is the bolt 17; and a reverse motion is imparted to the front axle, owing to the arrangement of the cross rods 47, and said front axle is shifted upon its pivot, which is the pin 37. Thus, both the front and rear axles are turned in the proper directions so that the vehicle may be turned completely around in a comparatively small area of space.

The various universal joints in the driving mechanism permit the axles to be shifted upon their pivot points, while the vehicle is being turned, and the driving connections automatically lengthen and shorten, owing to the motion of the various shafts in their corresponding sleeves.

A motor vehicle of my improved construction is of the type usually termed "four-wheeled drive," and therefore greater traction is secured as compared to a vehicle where only one axle is driven, and this results in an equal division of the strain on the various driving parts due to the power transmitted thereto.

The tires on the wheels will have much longer life due to the fact that the wear and strain upon said tires is equal, and as all of the wheels are driven the tendency to skid while in motion will be reduced to a minimum.

I claim:

1. In a motor vehicle, a frame, front and rear axles pivotally mounted at their centers beneath the frame, traction wheels fixed on the ends of said axles, differential gearing arranged on the axles, pinions meshing with and driving said differential gearings, flexible extensible shafts arranged to drive the pinions, means carried by the frame for driving the flexible extensible shafts, a pair of cross rods pivotally connected at their ends to the ends of the axles, a rod pivotally connected to one of the cross rods, and means arranged on the frame for imparting longitudinal movement to the rod.

2. In a motor vehicle, a frame, front and rear axles, traction wheels arranged on said axles, differential gearing arranged on the axles, casings inclosing the differential gearing, arch bars pivotally mounted on the tops of the gear casings and supporting the ends of the vehicle frame, pinions meshing with and driving said differential gearings, flexible extensible shafts arranged to drive the pinions, means carried by the frame for driving the flexible extensible shafts, a pair of cross rods pivotally connected at their ends to the ends of the axles, a rod pivotally connected to one of the cross rods, and means arranged on the frame for imparting longitudinal movement to the rod.

In testimony whereof, I have signed my name to this specification, in presence of two subscribing witnesses.

WILLIAM C. SCHWARZ.

Witnesses:
  EDWARD E. LONGAN,
  M. P. SMITH.